April 15, 1952
E. A. ROCKWELL
2,593,193
SEALING MEANS
Filed Feb. 21, 1947
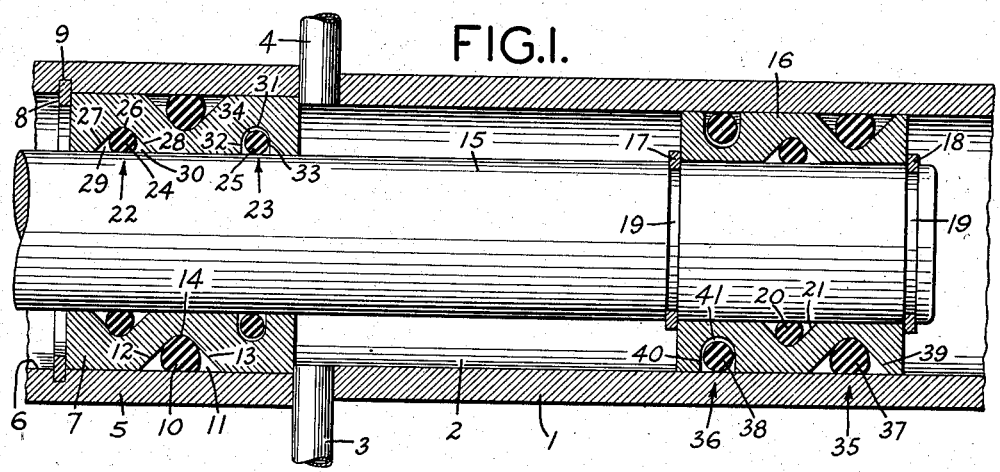
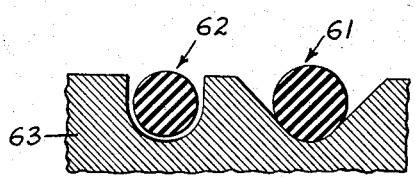
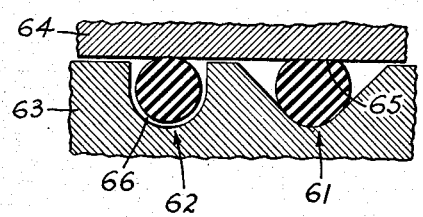
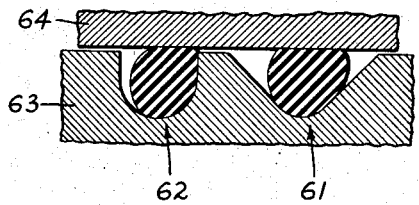
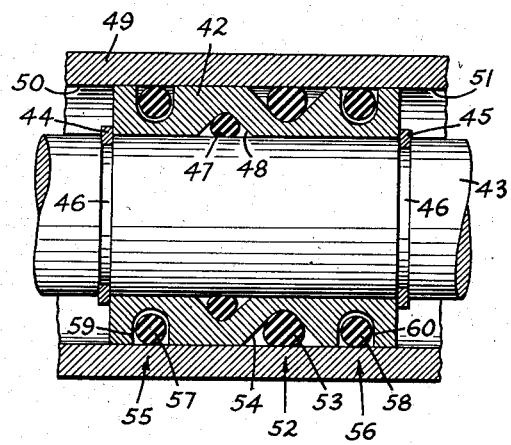
INVENTOR
EDWARD A. ROCKWELL
BY
ATTORNEY Patented Apr. 15, 1952

2,593,193

UNITED STATES PATENT OFFICE 2,593,193

SEALING MEANS

Edward A. Rockwell, Shaker Heights, Ohio

Application February 21, 1947, Serial No. 729,931

8 Claims. (Cl. 309—23)

My invention relates particularly to sealing means which may be used in connection with plungers and cylinders of many different kinds. For example, my invention, for effective sealing plungers in cylinders, may be used on power units as shown and described in my copending application upon Unit for Providing Power, Ser. No. 690,638, filed August 15, 1946.

The object of my invention is to provide a sealing means which will provide an effective seal for pressure fluids, such as liquids or gases, so as to be substantially entirely leak-proof and which has, nevertheless, a low friction coefficient, as well as a long life in use. Previously many different seals have been attempted for this purpose, as for instance ring seals located around pistons or within cylinders for sealing against fluids under pressure, but have been found to be ineffective to prevent entirely the presence of leakage, and this has been found to be the case with such previous seals even where a pair of such previous types of seals have been used together. Furthermore, such previous seals had the disadvantages of trapping the pressure fluid between the individual seals, so that upon the release of the applied pressure the pressure fluid trapped between the seals could not escape, which has been found to be a distinct disadvantage in practice. Besides, such previous seals have been subject to rapid wear because of the excessive friction, thus requiring frequent replacement of the seals, no matter whether lip seals or other ring seals were used.

The object of my invention is, therefore, to avoid these disadvantages and it has been found, after extensive use and tests of the seals made in accordance with my invention, that there is substantially no leakage whatever through these seals and that when the pressures are released there is no trapping of the high pressures between the seals. Accordingly, the seals made in accordance with my invention will not only prevent leakages at low pressures but will, likewise, prevent leakages at high pressures. Furthermore, my seals have a very low degree of friction in use, thus permitting sensitive relative controlling movements between the pistons and cylinders, resulting in long life of the seals due to the extremely small amount of wear. Further objects of my invention will appear from the detailed description of the same hereinafter.

While my invention is capable of embodiment in many different forms for the purpose of illustration I have shown only certain forms thereof in the accompanying drawings, in which—

Fig. 1 is a vertical section of a piston and cylinder equipped with seals made in accordance with my invention;

Fig. 2 is a vertical section of a piston and cylinder having a double acting piston thereon provided with sealing means effective for high pressures as well as low pressures from either end of the piston;

Fig. 3 is a diagrammatic vertical section representative of a portion of the piston periphery carrying the two annular seals shown in position for installation in the cylinder;

Fig. 4 is a similar view to that shown in Fig. 3, but showing, in this instance, the seals on the periphery of the piston after having been installed in the cylinder and under the influence of low pressures from the left-hand end thereof, before the application of high pressures; and Fig. 5 is a similar view of Fig. 4, showing the position of the seals after the application of high pressure from the left-hand end of the same.

In the drawings, referring first to Fig. 1, I have shown a high pressure cylinder 1 having a cylindrical pressure chamber 2 therein which may be provided with any desired inlet pipe 3 having any desired means for providing and controlling the supply of pressure fluid, as for instance a hydraulic liquid, into the same and having, also, an outlet pipe 4 which may be provided with any desired connection to a device for work-performance, as for instance an automotive vehicle accessory such, for instance, as a wheel brake (not shown). The left-hand portion of the cylinder 1 may be provided, if desired, with an enlargement 5 having an enlarged cylinder 6 therein for receiving a bushing 7 held in place by a split snap ring 8 in a groove 9. The bushing 7 may be provided on its outer face with any desired type of annular seal, but, for example, a ring seal 10 circular in cross-section and made of rubber or a rubber substitute, and which may be carried in a recess 11 having flared walls 12 and 13 and a rounded base 14. As the bushing 7 and the cylindrical portion 5 are stationary, such seal 10 may be of any desired type to prevent leakage. However, on the inner face of the bushing 7 there is carried a sliding piston rod 15 carrying on its end a piston 16 held in place on the rod 15 by split rings 17 and 18 in grooves 19 on the periphery of the rod 15. The piston 16, not being movable relative to the piston rod 15, there is an annular seal 20 of any desired type provided around the piston rod 15 and located in a right angular recess 21, said seal 20 and recess 21 being, for instance, like the seal 10 and recess 11 previously described.

Inasmuch as the piston rod 15 slides within the bushing 7, a special type of sealing means, made in accordance with my invention, is necessary in order to effectively prevent any leakage whatever of the pressure fluid in the reciprocation of the piston rod 15 carrying the piston 16 thereon. For this purpose, I provide a low pressure seal 22 and a high pressure seal 23 which are, respectively and together, constructed in a novel manner in accordance with my invention. This low pressure seal 22, as well as the high pressure seal 23, are provided, respectively, with rings 24 and 25, preferably made of a deformable elastic or resilient material such as a rubber substitute, as for instance neoprene, which will tend to shrink somewhat in use, for instance in the presence of hydraulic brake fluids containing, for example, alcohol, castor oil or both, which may have this effect upon the material of which the rings 24 and 25 are made. Furthermore, it will be noted that the low pressure seal 22 has a shallow V-shaped recess having, preferably, a rounded bottom portion 26 and flared sides 27 and 28 providing annular chambers 29 and 30 adjacent to the sides of the ring 24 which is of such a size that when the piston rod 15 is inserted therein the ring 24 will be slightly flattened at the point of contact with the piston rod 15. On the other hand, in the case of the high pressure seal 23, the ring 25 is of such a size as not to be initially compressed by the piston rod 15 and is even provided with a deep U-shaped recess having a rounded bottom portion 31 and parallel sides 32 and 33 in such a manner as to leave initially, before a high fluid pressure is applied, a passageway 34 extending completely beneath the bottom and sides of the ring 25. Similarly, the piston 16 is provided on its outer periphery with a high pressure seal 36 and a low pressure seal 35 which, respectively, have sealing rings 38 and 37, preferably made of a deformable elastic or resilient material which will tend to expand slightly in the presence of such liquids, as for instance rubber. However, in this instance, also the low pressure ring 37 is provided with a V-shaped recess 39 constructed the same as the recess for the ring 24 and so that the ring 37 will be flattened slightly under compression when the piston 16 is introduced into the cylinder 1. Likewise, the high pressure ring 38 will be of such a size as not to be flattened or compressed initially by insertion into the cylinder 1, nor by applied low pressures, and is also provided with a U-shaped recess 40 leaving, under such conditions, a passageway 41 initially beneath the same as in the case of the U-shaped recess for the ring 25.

As shown in Fig. 2, instead of the construction illustrated and described in connection with Fig. 1, primarily intended for a single-acting piston, I may provide a double-acting piston 42 carried by a piston rod 43 and held in place by split snap rings 44 and 45 carried in annular recesses 46 on the piston rod 43. This double-acting piston 42 may have any desired type of internal annular seal of elastic material, such as rubber or a rubber substitute, 47, carried in a V-shaped recess 48. The piston 42 may operate within a cylinder 49 having cylindrical chambers 50 and 51 at the opposite ends thereof, respectively, or fluids, such for instance as hydraulic liquids, which may be at different times under high fluid pressures, alternating with lower fluid pressures. Each of said cylindrical chambers 50 and 51 may have, if desired, inlet and outlet connections, such for instance as the pipes 3 and 4 previously described, and may, if desired, be closed by a sealed bushing such, for instance, like the bushing 7 previously described. The double-acting piston 42, at its outer periphery, may have a low pressure annular seal 52 in the form of a rubber ring 53 in a V-shaped recess 54 constructed the same as the seal 37 and the recess 39. Likewise, on opposite sides of the low pressure seal 52 there are provided high pressure seals 55 and 56, each of the same having, respectively, rubber rings 57 and 58 in U-shaped recesses 59 and 60, constructed the same as the high pressure ring 38 and recess 40.

As shown diagrammatically in Fig. 3, I have illustrated one of the above mentioned low pressure seals 61 alongside of one of the said high pressure seals 62 on the piston 63 before installation in the cylinder in which it may be used and, thus, showing not only the rounded upper surface of the sealing ring in the low pressure seal 61 but also the passageway between the high pressure seal 62 and its U-shaped recess in the piston 63. It will be understood, of course, that this same position will occur before installation, also, where the seals 61 and 62 are carried by the cylinder before inserting the piston or piston rod therein in the case where the seals 61 and 62 are mounted on the cylinder instead of the piston.

In Fig. 4 I have shown the same parts as illustrated in Fig. 3 with, however, the piston 63 having already been installed in a cylinder 64 or vice versa, and when low fluid pressure may already have been applied. This shows an initial flat position 65 of the outer face of the low pressure sealing ring and the presence of a passageway 66 beneath the high pressure sealing ring before the high fluid pressures are applied.

In Fig. 5 I have shown in the same parts as illustrated in Fig. 4, but showing the result of the application of high fluid pressures, for example, from the left-hand end of Fig. 5. This results not only in deforming the low pressure ring in the low pressure seal 61 towards the right into the right-hand side of the V-shaped recess so as to increase the areas of contact peripherally and laterally, but also in moving the high pressure ring towards the right to close the passageway 66 beneath the same, and, likewise, deforming the high pressure ring to increase its areas of contact with the cylinder and piston peripherally and laterally.

The operation of my invention is illustrated in the said Figs. 3, 4 and 5, in that initially, as shown in Fig. 4, the low pressure sealing ring has a flattened upper surface 65 and flattened lateral surfaces due to insertion in the cylinder 64 while still leaving the passageway 66 open beneath the high pressure ring 62 even when low fluid pressures are being applied, for instance from the left in Fig. 4. When, however, these low pressures are increased to become high fluid pressures, from the left in Fig. 5, the low pressure sealing ring still seals against ony of the pressures present by a further increase of its areas of contact peripherally and laterally, but with substantially only relatively low pressures on the left side of the low pressure sealing ring 61, and the high pressure sealing ring 62 will now increase its area of contact peripherally and laterally to close off the passageway 66 beneath the latter so as to seal against most of the high fluid pressure and even prevent any great access of high fluid pressure to the low pressure sealing ring 61. When the high fluid pressure is released, from the left, the passageway 66 will be restored beneath the high pressure sealing ring 62, thus preventing any trapping of high fluid pressures between the two seals 61 and 62, although the low pressure sealing ring 61 will still continue to seal the piston and cylinder against low pressures. Not only is, thus, any possible leakage substantially entirely prevented but there is a low amount of friction and an ease of operation in the movement of the piston in the cylinder, which will be evident from the relaxation of the high pressure sealing ring 62 during the changes of pressures to which it is subjected due, partly, to the possible movement of the low pressure sealing ring 61 into one or the other of the spaces beside the same in its V-shaped recess. Accordingly, there is also a very long life of operation of these seals 61 and 62 for the same reasons.

While I have described my invention above in detail I wish it to be understood that many changes may be made therein without departing from the spirit of the same.

I claim:

1. A sealing means to which fluid pressure is adapted to be applied, comprising members including a cylinder and a piston guided for axial movement therein, one of which has thereon a normally closed annular resilient seal at all times pressed against the other member by a recess in which it is carried before the application of fluid pressure, and a normally open second annular resilient seal resting lightly against said other member in a rounded recess deeper and wider than the second annular seal and contacting said recess when fluid pressure is applied, so as to avoid trapping high pressure fluid against the first seal and friction produced thereby.

2. A sealing means to which fluid pressure is adapted to be applied, comprising members including a cylinder and a piston guided for axial movement therein, one of which has thereon a normally closed annular resilient seal, circular in cross-section, at all times pressed against the other member by a recess in which it is carried before the application of fluid pressure, and a normally open second annular resilient seal, circular in cross-section, resting lightly against said other member in a rounded recess deeper and wider than the second annular seal and contacting said recess when fluid pressure is applied, so as to avoid trapping high pressure fluid against the first seal and friction produced thereby.

3. A sealing means to which fluid pressure is adapted to be applied, comprising members including a cylinder and a piston guided for axial movement therein, one of which has thereon a normally closed annular resilient seal, circular in cross-section, at all times pressed against the other member by a V-shaped recess in which it is carried before the application of fluid pressure, and a normally open second annular resilient seal, circular in cross-section, resting lightly against said other member in a rounded recess deeper and wider than the second annular seal and contacting said recess when fluid pressure is applied, so as to avoid trapping high pressure fluid against the first seal and friction produced thereby.

4. A sealing means to which fluid pressure is adapted to be applied, comprising members including a cylinder and a piston guided for axial movement therein, one of which has thereon a normally closed annular resilient seal, circular in cross-section, at all times pressed against the other member by a recess in which it is carried before the application of fluid pressure, and a normally open second annular resilient seal, circular in cross-section, resting lightly against said other member in a U-shaped recess with a rounded interior deeper and wider than the second annular seal and contacting said recess when fluid pressure is applied, so as to avoid trapping high pressure fluid against the first seal and friction produced thereby.

5. A sealing means to which fluid pressure is adapted to be applied, comprising members including a cylinder and a piston guided for axial movement therein, one of which has thereon a normally closed annular resilient seal, circular in cross-section, at all times pressed against the other member by a V-shaped recess in which it is carried before the application of fluid pressure, and a normally open second annular resilient seal, circular in cross-section, resting lightly against said other member in a U-shaped recess with a rounded interior deeper and wider than the second annular seal and contacting said recess when fluid pressure is applied, so as to avoid trapping high pressure fluid against the first seal and friction produced thereby.

6. A sealing means to which fluid pressure is adapted to be applied, comprising members including a cylinder and a piston guided for axial movement therein, one of which has thereon a normally closed annular resilient seal, circular in cross-section, at all times pressed against the other member by a V-shaped recess in which it is carried before the application of fluid pressure, and a normally open second annular resilient seal, circular in cross-section, resting lightly against said other member in a U-shaped recess deeper and wider than the second annular seal and contacting said recess when fluid pressure is applied, so as to avoid trapping high pressure fluid against the first seal and friction produced thereby, one of said members having a bushing on one face of which said annular seals are carried, the other face of said bushing being also provided with a third annular seal.

7. A sealing means to which fluid pressure is adapted to be applied, comprising members including a cylinder and a piston guided for axial movement therein, one of which has thereon a normally closed annular resilient seal, circular in cross-section, at all times pressed against the other member by a V-shaped recess in which it is carried before the application of fluid pressure, and onother normally open annular resilient seal on either side of said first mentioned seal, circular in cross-section, resting lightly against said other member in a U-shaped recess with a rounded interior deeper and wider than the other annular seal and contacting said recess when fluid pressure is applied, so as to avoid trapping high pressure fluid against the first seal and friction produced thereby.

8. In combination, two cylindrical elements having a sliding clearance between them and a range of fluid pressure adapted to be applied to the clearance, at least two annular seals of a resilient deformable material located between said cylindrical elements assembled in annular grooves in one of said elements and having such dimensions relative to the grooves, and clearance as to provide a first groove for one of said seals, a leading edge of which is in contact with said pressure fluid, said one of said seals having normally a dimension such as at all times to contact the other sliding element but to have at times freedom from contact within its groove which is deeper and wider than said one of said seals to avoid trapped high pressure fluid beyond the first groove, and to provide a second groove adjacent to the first groove, said second groove having a dimension with respect to a second seal as to maintain at all times a deformable contact with the other sliding element as well as at all times a deformable contact within its groove, so that the second seal is subject to substantially only a static or relatively low range of pressure at times when said first seal is free in its groove, and so that the relative dimensions of the first and second grooves with respect to their seals provide resilient deformable means for sealing off higher ranges of pressure fluid from the second seal, thereby limiting the friction between the said two seals and said other sliding element.

EDWARD A. ROCKWELL.

REFERENCES CITED

The following references are of record in the file of this patent:

UNITED STATES PATENTS

| Number | Name | Date |
| --- | --- | --- |
| 2,115,383 | Christensen | Apr. 26, 1938 |
| 2,314,683 | Berry | Mar. 23, 1943 |
| 2,401,379 | Smith | June 4, 1946 |
| 2,429,426 | Phillips et al. | Oct. 21, 1947 |

FOREIGN PATENTS

| Number | Country | Date |
| --- | --- | --- |
| 177,010 | Switzerland | Aug. 1, 1935 |

OTHER REFERENCES

Product Engineering, page 101, February 1945.